(12) United States Patent
Wright et al.

(10) Patent No.: US 8,878,060 B2
(45) Date of Patent: Nov. 4, 2014

(54) ZERO FORCE CONDUCTIVE MEMBRANE

(75) Inventors: Derek Wright, San Francisco, CA (US); Erik A. Uttermann, San Francisco, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 13/286,006

(22) Filed: Oct. 31, 2011

(65) Prior Publication Data

US 2013/0107425 A1    May 2, 2013

(51) Int. Cl.
| | |
|---|---|
| *H05K 7/00* | (2006.01) |
| *F16J 15/00* | (2006.01) |
| *G06F 1/16* | (2006.01) |
| *H04M 1/02* | (2006.01) |

(52) U.S. Cl.
CPC ............ *G06F 1/1626* (2013.01); *G06F 1/1637* (2013.01); *H04M 1/0202* (2013.01)
USPC ..................... 174/50.5; 174/364; 361/679.01; 277/590; 277/605

(58) Field of Classification Search
CPC . E06B 7/2318; B06J 10/0037; B60J 10/0042; F16J 15/46; F16J 15/48
USPC ............... 174/17.06, 50.5, 32, 356, 358, 364, 174/370; 49/477.1; 277/583, 605, 312–316, 277/590, 645–646, 650; 220/232; 361/679.01
See application file for complete search history.

(56) References Cited

U.S. PATENT DOCUMENTS

| | | | | |
|---|---|---|---|---|
| 4,371,175 | A | * | 2/1983 | Van Dyk, Jr. ................. 174/357 |
| 4,399,317 | A |   | 8/1983 | Van Dyk, Jr. |
| 4,790,544 | A | * | 12/1988 | Kemp ............................ 277/314 |
| 5,045,635 | A | * | 9/1991 | Kaplo et al. .................. 174/354 |
| 5,070,216 | A | * | 12/1991 | Thornton ....................... 174/355 |
| 5,859,388 | A | * | 1/1999 | Allen et al. .................. 174/77 R |
| 6,250,647 | B1 |  | 6/2001 | Castensson |
| 7,071,409 | B2 |  | 7/2006 | Richard et al. |
| 2012/0317887 | A1 | * | 12/2012 | Duelli ........................... 49/477.1 |

* cited by examiner

*Primary Examiner* — Angel R Estrada
*Assistant Examiner* — Dimary Lopez Cruz
(74) *Attorney, Agent, or Firm* — Treyz Law Group; G. Victor Treyz

(57) ABSTRACT

An electronic device may include housing structures, electronic components, and other structures. A gap may be formed between the structures. A membrane structure may be used to bridge the gap to form and environmental seal and electrical pathway between the structures. The membrane structure may be deployed using a temporary biasing member or may be installed by forming an inflatable structure. The inflatable structure may include an elastomeric balloon that may be pressurized. Adhesive such as conductive adhesive may be used in attaching the membrane structure to the structures in the electronic device. An inflatable structure may be depressurized following installation in an electronic device to minimize residual forces.

17 Claims, 14 Drawing Sheets

ZERO FORCE CONDUCTIVE MEMBRANE

BACKGROUND

This relates generally to electronic devices, and more particularly, to zero-force membranes for use in electronic devices.

Electronic devices such as portable computers and cellular telephones are often provided with components such as displays and housing structures that need to be electrically shorted to each other. Materials such as conductive foam may be used to form connections between such structures. However, conductive foam may create residual biasing forces. These forces may tend to push components apart following assembly.

It would therefore be desirable to provide improved ways in which to form connections such as electrical connections between structures in an electronic device while producing minimal residual forces.

SUMMARY

An electronic device may include housing structures, electronic components, and other structures. Gaps may be formed between the structures. For example, a gap may be formed between a housing structure and a component that is mounted within the housing structure.

One or more membrane structures may be used to bridge the gaps. The membrane structures may be implemented using a zero-force membrane arrangement in which a flexible structure such as a flexible sheet of material or a flexible balloon structure or other defeatable biasing element temporarily biases a membrane against device structures such as housing structures. Following use of the defeatable biasing element to attach the membrane to the device structures, the biasing element may be deactivated (e.g., by puncturing a balloon-based biasing element or by applying heat or other stimulus to the biasing element. The biasing element may also be removed so as to remove the temporary biasing force that is produced by the biasing element. The zero-force membranes that results from removing the force produced by the biasing element may exhibit little to no residual biasing force against the electronic device structures following assembly. The zero-force membranes may be used to form environmental seals between portions of electronic device structures and electrical connections such as grounding connections.

The zero-force membranes may be deployed by temporary biasing structures such as defeatable biasing structures that temporarily bias the membranes against device structures. Following formation of a desired connection with a membrane, the temporary biasing structures can be removed to remove the biasing force or may be deactivated (defeated) and left in place. Examples of temporary biasing structures include foam, springs, a material that melts, a shrinkable material, or a material that otherwise yields after biasing the membrane against device structures. A removable inflatable balloon structure may also be used to install a zero-force membrane.

Zero-force membranes may be deployed using inflatable structures (e.g., non-removable inflatable structures) that can be deflated by puncturing or by providing pressure relief structures.

An inflatable structure may, for example, be formed from an elastomeric balloon that can be pressurized by a fluid such as air. Adhesive such as conductive adhesive may be used in attaching the inflatable structure to the structures in the electronic device.

When an inflatable structure is pressurized, the inflatable structure may form an environmental seal that bridges a gap between structures in the electronic device. The inflatable structure may also be pressurized to form an electrical shorting path that bridges the gap.

The inflatable structure may be depressurized following assembly to remove residual biasing forces against the structures. The inflatable structure may be depressurized by withdrawing pressurized fluid from the inflatable structure, by providing a hole in the inflatable structure that allows pressurized fluid to escape, by over-pressuring the inflatable structure to form a rupture that allows the fluid to escape, or by otherwise depressurizing the inflatable structure.

Further features of the invention, its nature and various advantages will be more apparent from the accompanying drawings and the following detailed description.

DETAILED DESCRIPTION

Electronic devices may be provided with zero-force membranes. The zero-force membranes may be used to form environmental seals between portions of electronic device structures and electrical connections such as grounding connections. The zero-force membranes may exhibit little to no residual biasing force against the electronic device structures following assembly.

The zero-force membranes may be deployed by using removable foam or other temporary biasing structures to hold flexible structures such as layers of polymer and adhesive against device structures. Following formation of a desired connection with a membrane, the temporary biasing structures can be removed or the amount of biasing force that is produced by the temporary biasing structures may be reduced or eliminated by deactivating the temporary biasing structures and leaving the temporary biasing structures in place.

If desired, zero-force membranes may be formed from inflatable structures. The inflatable structures (inflatable membranes) may include balloon-type structures that allow the inflatable structures to be temporarily pressurized. The inflatable structures may be pressurized to force sidewalls portions of the inflatable structures against adjacent electronic device structures. Adhesive may be used to help hold the sidewalls of the inflatable structures in place. The inflatable structures may include conductive materials such as metal that allow the inflatable structures to form electrical shorting structures between conductive device structures. The inflatable structures may also be used to form environmental seals.

Once an inflatable structure has been used to form conductive pathways and/or environmental seals within an electronic device, the inflatable structure may be depressurized. Depressurization operations may be performed by allowing air to escape a pressurized structure through a hole in the structure or a porous structure, by intentionally rupturing the inflatable structure by over-pressuring the structure as part of the inflatable structure installation process, or by removing pressurized air using a needle or other air removal structure. By removing pressure from the inflatable structures, the structures may form zero-pressure connections and/or seals within a device. The minimal pressure exerted by the inflatable structures ensures that the structures will not tend to push apart device structures during normal use of a device following installation of inflatable structures.

Temporary biasing structures based on springs, foam, or other defeatable structures may be deactivated following membrane deployment. For example, heat or other stimulus may be applied to deactivate temporary biasing structures. Temporary biasing structures may also be removed following use, if desired.

Figure 1:
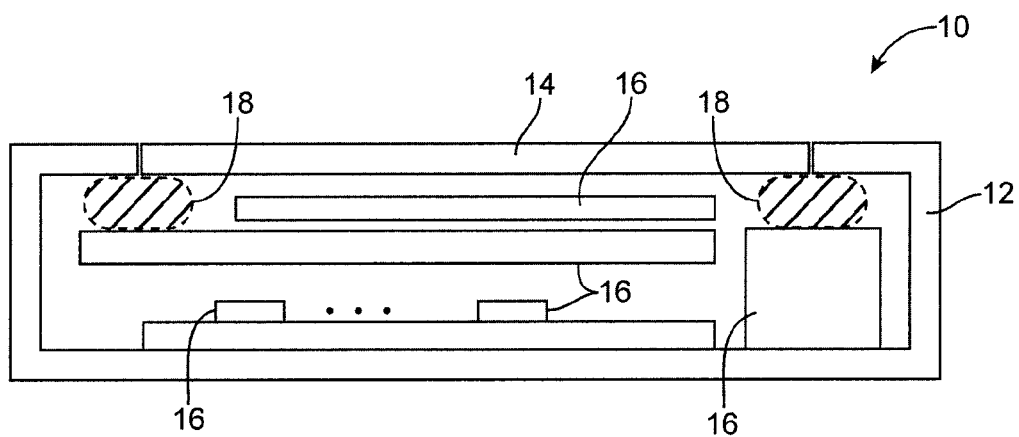
FIG. 1 is a perspective view of an illustrative electronic device of the type that may be provided with inflatable structures in accordance with an embodiment of the present invention.

An illustrative electronic device of the type that may be provided with one or more inflatable structures is shown in FIG. 1. Electronic device 10 of FIG. 1 may be a computer, a personal computer, a tablet computer, a cellular telephone, a media player, a gaming device, a navigation device, or other electronic equipment. As shown in the cross-sectional view of device 10 in FIG. 1, electronic device 10 may include housing 12, a display such as display 14, and internal components such as components 16. The structures of device 10 may include conductive structures. For example, housing 12 may include one or more conductive metal structures, display 14 may include conductive structures, and other electronic components 16 may include conductive structures.

To form electrical connections (e.g., grounding connections or other shorting connections) and/or to form environmental seals between different portions of device 10 (e.g., housing structures 12, display 14, and/or other electrical components 16), device 10 may be provided with one or more defeatable biasing structures. As shown in FIG. 1, for example, device 10 may be provided with inflatable structures 18.

Inflatable structures 18 may be formed from elastomeric balloons and may include one or more coatings or other external structures that fully or partly surround the balloons. The surface of the inflatable structures may be conductive (e.g., for use in arrangements where shorting connections are desired) or insulating (e.g., for use in environmental sealing applications or other configurations in which electrical shorting by the inflatable structures is not desired).

Figure 2:
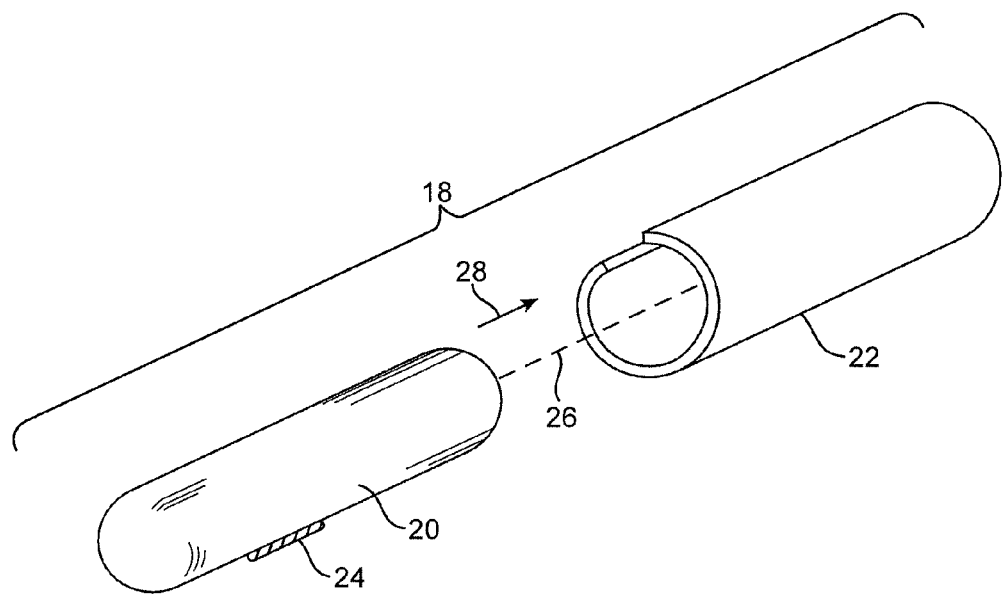
FIG. 2 is an exploded perspective view of an illustrative inflatable structure in accordance with an embodiment of the present invention.

FIG. 2 is an exploded perspective view of an illustrative inflatable structure. As shown in FIG. 2, inflatable structure 18 may include inflatable balloon structure 20 and, if desired, one or more additional layers of material such as external flexible sheet 22. Inflatable balloon structure 20 may be formed from an elastomeric substance such as silicone that expands when pressurized. Inflatable balloon structure 20 may be pressurized by forcing a fluid such as a gas (e.g., air, nitrogen, etc.) or a liquid (e.g., water, alcohol, etc.) into the interior of structure 20. Balloon 20 may be installed within flexible sheet 22 by moving balloon 20 in direction 28 along longitudinal axis 26 or by wrapping sheet 22 around balloon 20. Optional adhesive 24 may be used to help hold balloon 20 in place within flexible sheet 22 following assembly.

Flexible sheet 22 may be formed from one or more sublayers of material. Each of the one or more layers that forms flexible sheet 22 may be formed from polymer or other insulators, metal (e.g., a metal coating formed form metal foil or other structures, a metal mesh, etc.), adhesive (e.g., pressure sensitive adhesive and/or conductive adhesive), and other materials.

Figure 3:
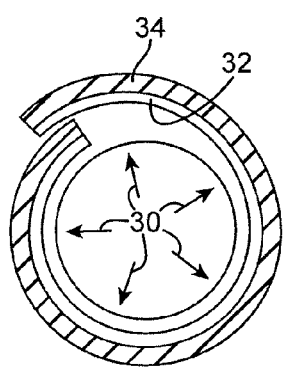
FIG. 3 is a cross-sectional end view of an inflatable structure of the type shown in FIG. 2 in accordance with an embodiment of the present invention.

FIG. 3 is a cross-sectional side view of inflatable structure 18 showing how inflatable balloon 20 may exert pressure outwards in directions 30 when pressurized with gas or other fluid. This may force sheet 22 against adjacent device structures (not shown in FIG. 3). Sheet 22 may be formed from sublayers such as sublayers 32 and 34 (and, optionally, additional sublayers).

Inner layer 32 may be, for example, a substrate material. The substrate material may be an insulating material such as a polymer (e.g., polyimide or polyethylene terephthalate) or may be a conductive material (e.g., a metal). To provide sheet 22 with flexibility, layer 32 may be formed from a flexible metal mesh (e.g., a metal fabric). Other conductive structures that may be used to form layer 32 include aluminum foil and a polymer substrate coated with a layer of metal.

Outer layer 34 may be an adhesive layer such as a pressure sensitive adhesive layer. Outer layer 34 may be, for example, a conductive adhesive (e.g., in configurations in which inner layer 32 is conductive).

In arrangements in which inflatable structure 18 has a conductive surface (e.g., a conductive adhesive formed on a metal mesh, metal foil, or metallized polymer substrate), inflatable structure 18 may be used to form shorting structures between respective conductive structures in device 10 (e.g., between a metal housing part and another metal housing part, between a metal housing structure and an electronic component, between conductive portions of two or more electronic components, etc.). In arrangements in which inflatable structure 18 is free of conductive adhesive and underlying conductive layers, inflatable structure 18 may be used to form seals (e.g., environmental seals that bridge gaps between structures in device 10). Seals may be formed to prevent dust and moisture from intruding into internal device regions or to otherwise seal parts together in device 10.

Figure 4:
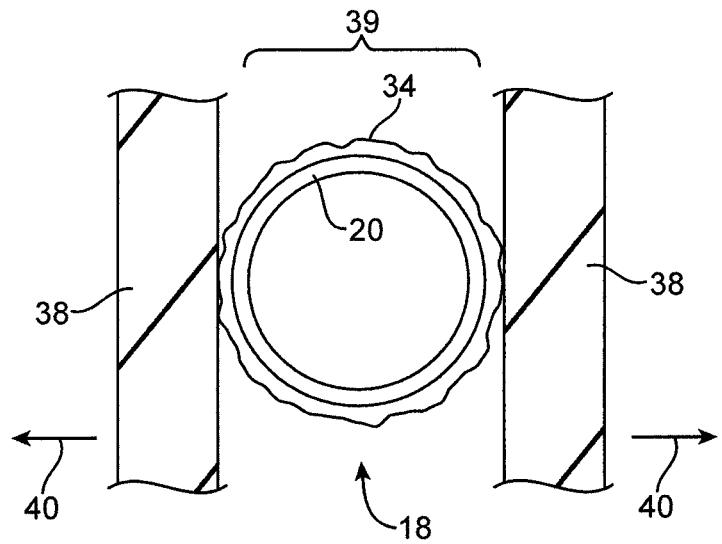
FIG. 4 is a cross-sectional side view of an inflatable structure having a coating formed from a layer of adhesive in accordance with an embodiment of the present invention.

As shown in the cross-sectional view of inflatable structure 18 of FIG. 4, structure 18 may be formed by directly coating balloon 20 with adhesive 34. In this type of configuration, substrate layer 32 need not be used. As shown in FIG. 4, inflatable structure 18 may become attached to one or more structure such as structures 38 that are separated by a gap such as gap 39 when inflatable structure 18 is inflated. Structures 38 may be housing structures, display structures, structures associated with other components in device 10 such as other electronic components, or other device structures.

Following formation of a seal and/or electrical shorting connection that bridges gap 39 between structures 38 of the type shown in FIG. 4, balloon 20 (and therefore inflatable structure 18) may be depressurized. Depressurization may eliminate or at least reduce residual pressure from inflatable structure 18 on structures 38. In the presence of pressure in structures 18, structures 38 (in the example of FIG. 4) will tend to be forced apart in opposing directions 40. This may tend to disassemble device 10, requiring the use of stronger internal structures and structures that are designed to overcome the force in directions 40 and thereby maintain structures 38 in their desired positions. Following depressurization of inflatable structures 18, however, structures 38 may be maintained in their desired positions without need to provide such additional structures to overcome the biasing force from structures 18.

Figure 5:
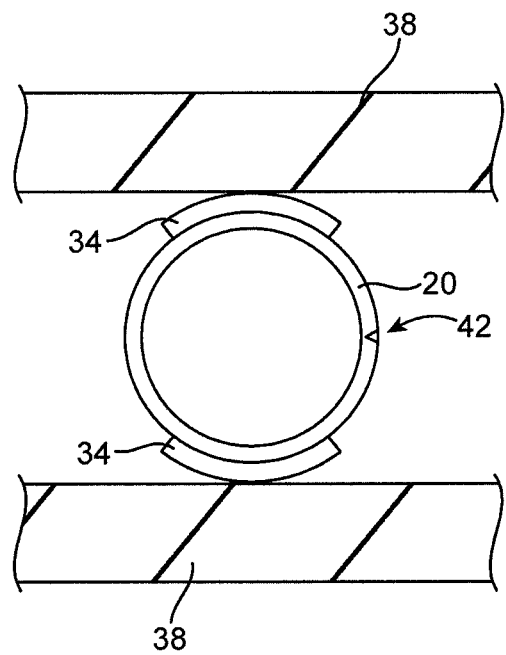
FIG. 5 is a cross-sectional side view of an inflatable structure having adhesive-coated regions with which the structure is attached to device structures in accordance with an embodiment of the present invention.

As shown in FIG. 5, inflatable structure 18 may be provided with adhesive 34 that coats only a portion of the surface of inflatable structure 18 (e.g., a portion of balloon 20). To facilitate depressurization, inflatable structure 18 may be provided with a depressurization (deflation) feature such as feature 42. Feature 42 may be a hole that is sufficiently large to allow pressurized fluid to escape from the interior of balloon 20 and that is sufficiently small to allow the release of pressure to be gradual. For example, the hole may be sufficiently small to allow structure 18 to remain pressurized until adhesive bonds have been formed using adhesive 34. The adhesive bonds need not be fully cured prior to depressurization, but preferably will have developed satisfactory strength to hold inflatable structure 18 in place. Features such a feature 42 may also be formed from permeable membrane regions (e.g., regions of balloon 20 that are configured to gradually allow fluid to escape), a localized scored region or other locally weakened region that is configured to promote localized rupture of balloon 20 (e.g., when balloon 20 exceeds a given pressure), or a port or other structure to allow a hollow needle or other pressurization and depressurization tool to enter and exit balloon 20.

Figure 6:
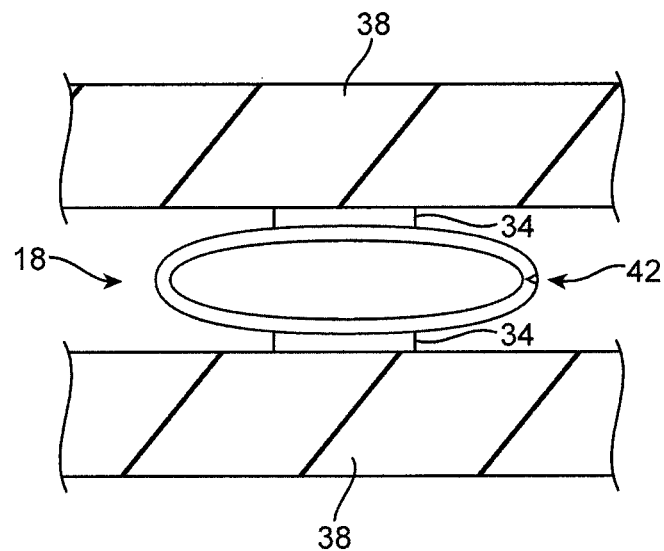
FIG. 6 is a cross-sectional side view of an illustrative inflatable structure in an inflated configuration between two opposing device structures in accordance with an embodiment of the present invention.
Figure 7:
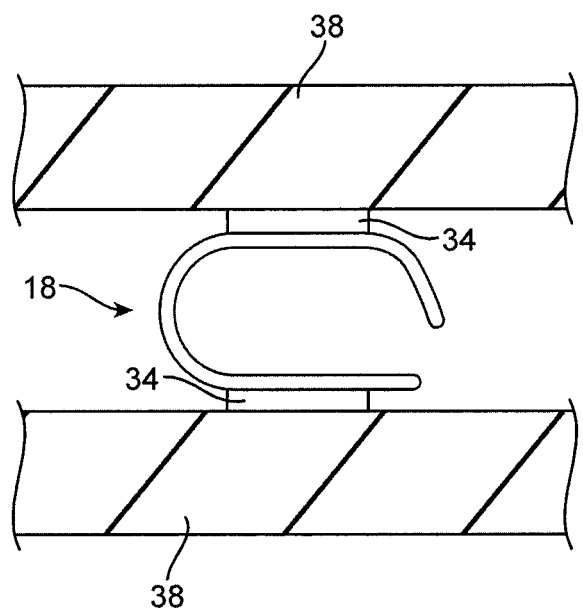
FIG. 7 is a cross-sectional side view of the structure of FIG. 6 following rupture of the structure to release internal pressure in accordance with an embodiment of the present invention.

FIG. 6 shows how structure 18 may be pressurized sufficiently to form a seal and/or electrical shorting connection between respective structures 38. FIG. 7 shows how structure 18 may appear following application of sufficient internal pressure to rupture structure 18 at depressurization feature 42. Although one part of structure 18 has ruptured in the example of FIG. 7, sufficient structures remain to form a satisfactory environmental seal and/or electrical shorting path bridging the gap between structures 38.

Figure 8:
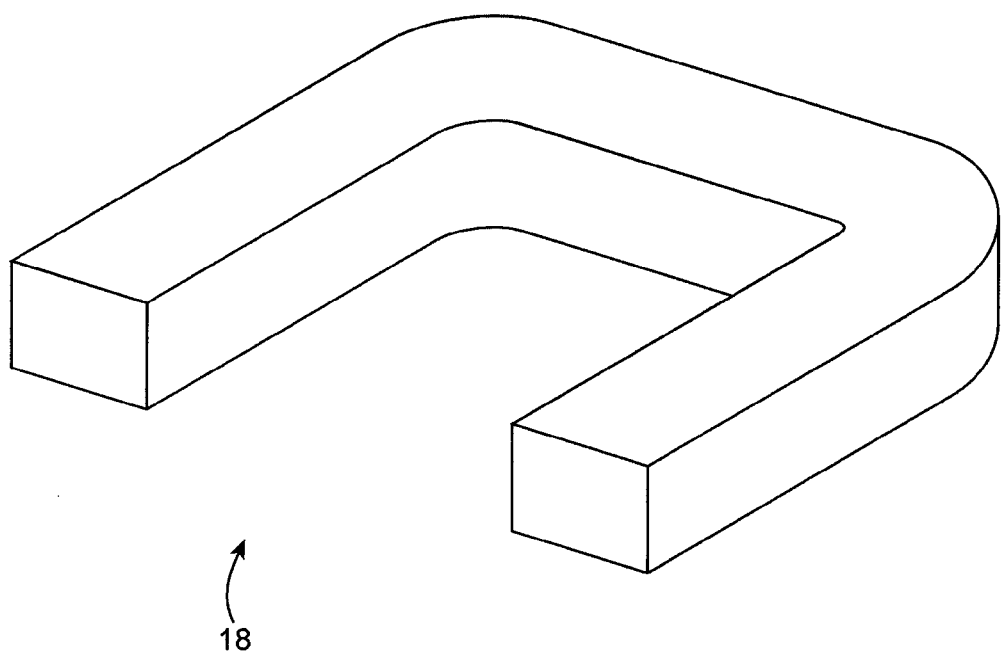
FIG. 8 is a perspective view of a U-shaped inflatable structure in accordance with an embodiment of the present invention.
Figure 9:
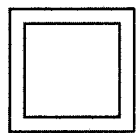
FIGS. 9, 10, 11, 12, and 13 are cross-sectional views of illustrative inflatable structures in accordance with embodiments of the present invention.

As shown in the perspective view of FIG. 8, structure 18 may have a U-shape. In general, structure 18 may have any suitable shape (e.g., a U-shape, an L-shape, a T-shape, a C-shape, a loop-shape, a rectangular loop shape, a solid rectangular shape, an elongated shape, an oval shape, a square shape, a shape with curved edges, a shape with straight edges, a shape with a combination of curved and straight edges, etc.

Figure 13:
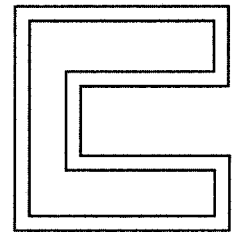

FIGS. 9, 10, 11, 12, and 13 are cross-sectional views of illustrative inflatable structures 18 showing some of the types of cross-sectional shapes that may be used in implementing an inflatable structure 18, including a square shape (FIG. 9), a circular shape (FIG. 10), an oval shape (FIG. 11), an L-shape (FIG. 12), and a C-shape (FIG. 13). Other cross-sectional shapes and combinations of these shapes may be used if desired. Combinations of any of these cross-sectional shapes and any of the illustrative outlines described in connection with the example of FIG. 8 may also be used.

Figure 14:
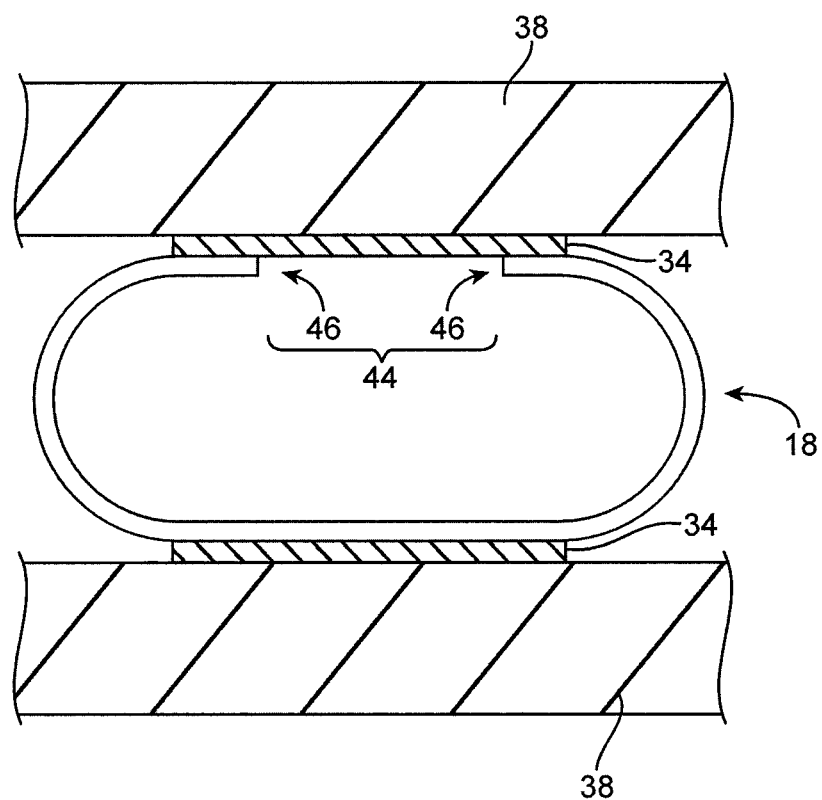
FIG. 14 is a cross-sectional view of an illustrative inflatable structure with an opening that is sealed using a layer of adhesive in accordance with an embodiment of the present invention.

As shown in FIG. 14, structure 18 may be pressurized by forming a seal along a layer of adhesive 34 on a device structure (e.g., without using a completely enclosed balloon structure). Ends 46 of balloon 20 are not connected to each other. The separation between ends 46 of the material that makes up balloon 20 forms opening 44. Nevertheless, opening 44 is sealed by virtue of adhesive 34 on structure 38.

Figure 15:
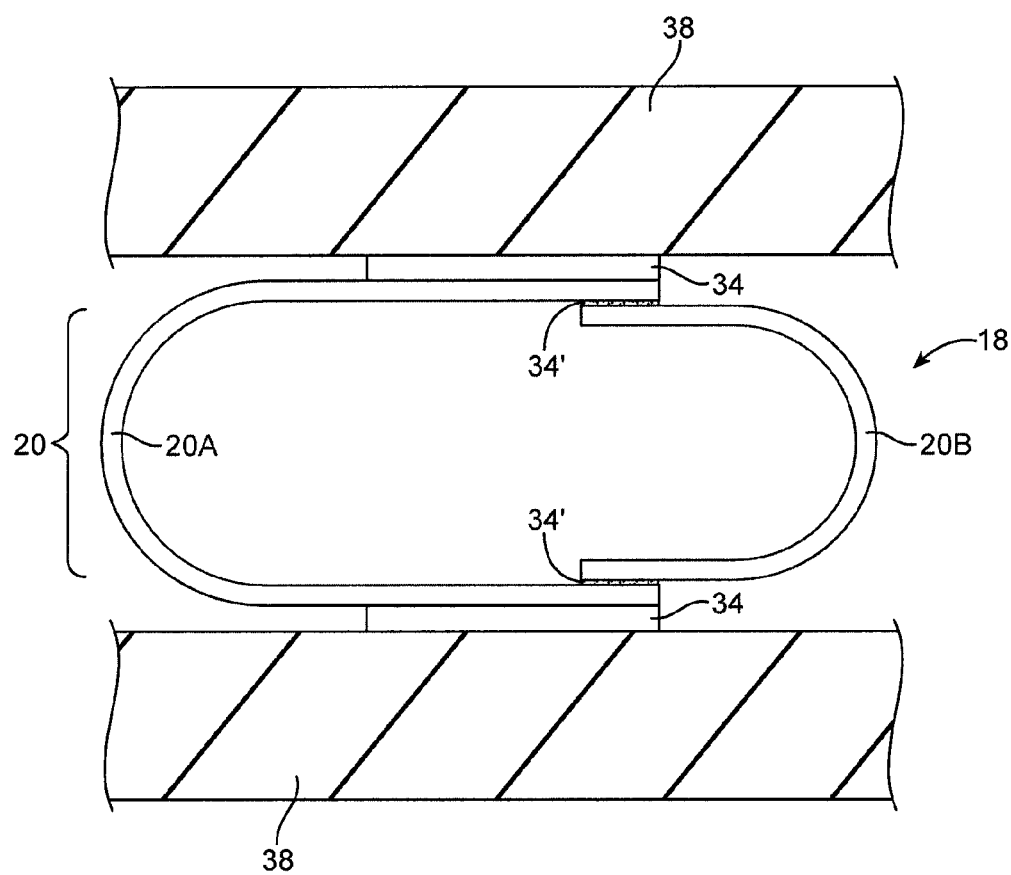
FIG. 15 is a cross-sectional end view of an inflatable structure having multiple overlapping layers of material in accordance with an embodiment of the present invention.

In the example of FIG. 15, inflatable structure 18 has been formed using a configuration for balloon 20 that includes overlapping structures 20A and 20B (sealed using adhesive 34').

Figure 16:
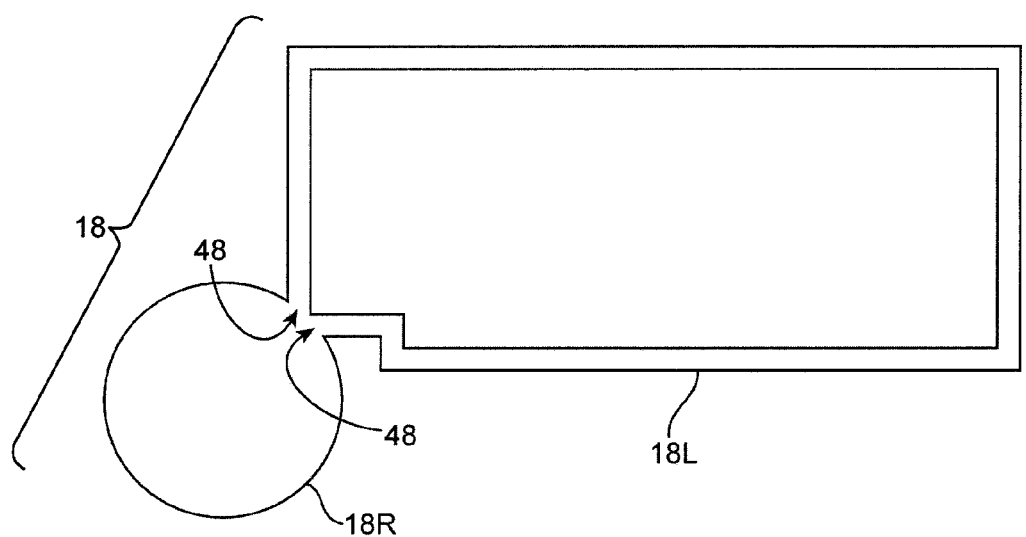
FIG. 16 is a top view of an illustrative inflatable structure having a fluid reservoir in accordance with an embodiment of the present invention.

As shown in FIG. 16, inflatable structure 18 may be provided with tube-shaped structures such as rectangular ring-shaped tubular structures 18L for forming seals and/or electrical shorting paths in corresponding portions of device 10 (e.g. elongated gaps between respective structures 38). To ensure that there is sufficient pressure in structure 18 following pressurization (and before depressurization), structure 18 may be provided with a fluid reservoir such as reservoir 18R. Reservoir portion 18R and main portion 18L may be coupled by internal passageways 48.

Figure 17:
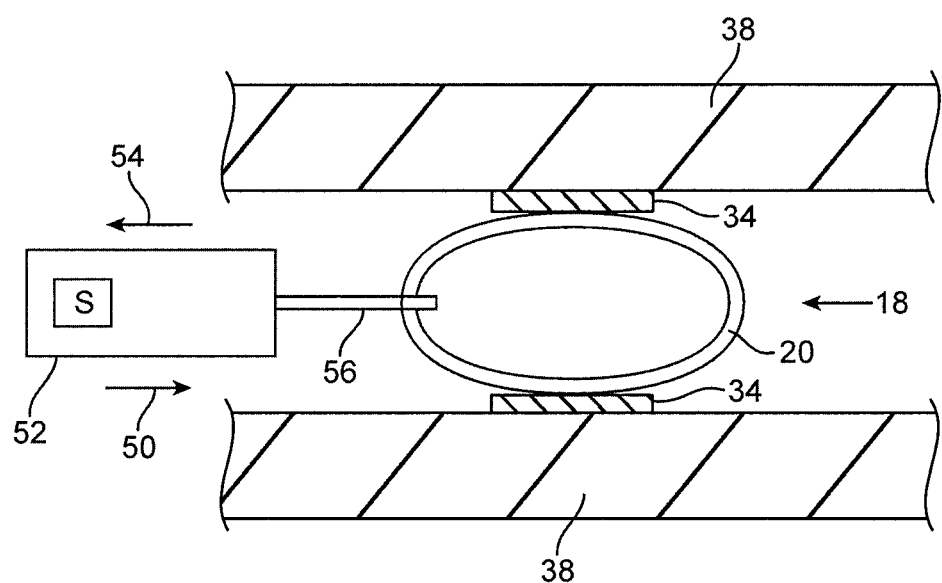
FIG. 17 is a cross-sectional view of an inflatable structure and associated pressurization and depressurization equipment in accordance with an embodiment of the present invention.

A system for pressurizing (and, if desired, depressurizing) inflatable structure 18 is shown in FIG. 17. As shown in FIG. 17, tool 52 may have a fluid source such as source S. Fluid from source S may be injected into the interior of balloon 20 in inflatable structure 18 via hollow needle 56 or other fluid passageway structure. To prepare structure 18 for pressurization using fluid, tool 52 may be moved in direction 50 until needle 56 enters balloon 20.

Structure 18 may be depressurized by removing needle 56 from balloon 20 by moving tool 52 in direction 54 and thereby creating an escape hole for fluid, by extracting fluid through needle 56 using tool 52, or by pressurizing structure 18 sufficiently that structure 18 ruptures, or by awaiting depressurization through a predefined hole in structure 18.

Figure 18:
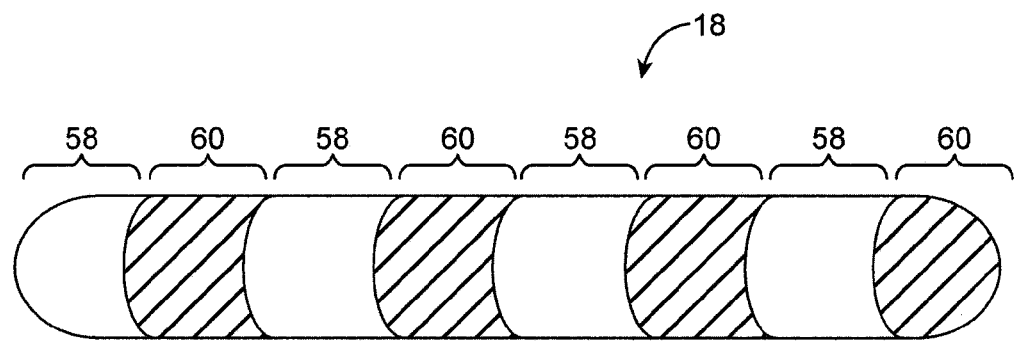
FIG. 18 is a perspective view of an illustrative inflatable structure having alternating regions with different types of coatings in accordance with the present invention.

As shown in FIG. 18, the surface of structure 18 may be provided with multiple coatings such as coatings 58 and 60. Coatings 58 and 60 may include polymers, metals, adhesives, conductive adhesive, etc. As an example, coatings 58 and 60 may be different types of adhesive (e.g., a conductive adhesive and a non-conductive adhesive). The use of different adhesive types may allow formation of adhesive coatings with desired properties (e.g., conduction from the conductive adhesive portions and adhesive strength from strength-optimized adhesive portions).

Figure 19:
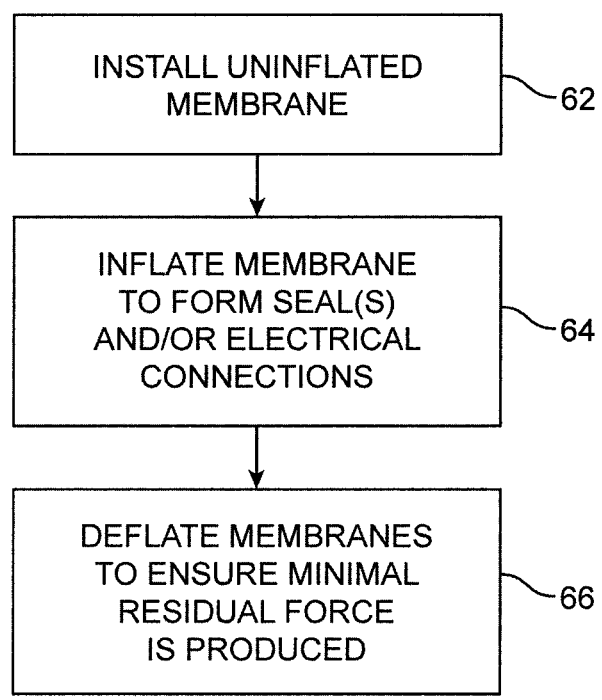
FIG. 19 is a flow chart of illustrative steps involved in incorporating inflatable structures into assembled device structures in accordance with an embodiment of the present invention.

FIG. 19 is a flow chart of illustrative steps involved in using inflatable structures such as inflatable structure 18 during the process of assembling electronic device 10.

At step 62, inflatable membrane 18 may be installed within an electronic device adjacent to structures 38 (e.g., housing structures, internal device components, conductive structures to be shorted together such as conductive housing structures and/or conductive portions of electrical device components, etc.).

At step 64, equipment such as tool 52 of FIG. 17 may be used to inject a gas such as air or other fluid into the interior of inflatable structure 18, thereby pressurizing and inflating structure 18. The inflation process may force adhesive 34 to make adhesive bonds between portions of structure 18 and portions of structures 38, bridging one or more gaps between structures 38. In configurations in which adhesive 34 includes conductive adhesive and/or when portions of structure 18 such as a metallic coating layer, metal fabric structure, or metal layer are formed from conductive structures, the bonds that are formed and the associated portions of structure 18 may form a conductive shorting path between structures 38. In configurations in which no conductive structures and conductive adhesive is included in structure 18, the pressurization process may form a non-shorting environmental seal between structures 38.

Following pressurization to form seals and/or conductive paths using structure 18, structure 18 may be depressurized (step 66). Depressurization may be performed by extracting fluid from structure 18 using tool 52, by over-pressurizing structure 18 (e.g., to cause structure 18 to rupture and thereby release its internal fluid), or by allowing fluid to slowly escape from a hole or porous membrane region in the sidewall of structure 18.

Because structure 18 may be depressurized following installation in device 10, structure 18 will tend not to generate residual biasing forces on structures 38 following assembly and may therefore serve as a zero-force membrane within device 10, forming an environmental seal and, if desired, an electrically conductive connecting structure.

If desired, zero-force membranes such as may be installed using removable biasing structures. Examples of biasing structures that may be removed from structures 18 after attachment of structures 18 to device structures (e.g., after attachment of membrane 22) include foam, a removable inflatable balloon, a spring (e.g., a spring with an oblique or acute L-shaped cross-sectional shape), an elastomer, a material that may be caused to yield (e.g., to facilitate removal following membrane installation) such as plastic, wax, or other material that melts, shrinks, or softens after the application of a chemical, visible or ultraviolet light, or heat stimulus (e.g., heat from inductive heating of the membrane, adjacent structures 38, or a tool, heat from radiant/conductive heating), a bimetallic strip that generates a removable bias by heating and cooling, or other biasing structure.

Figure 10:
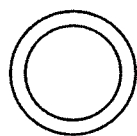
Figure 11:
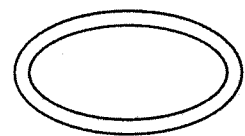
Figure 12:
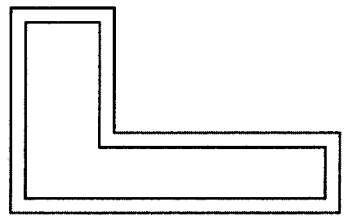
Figure 20:
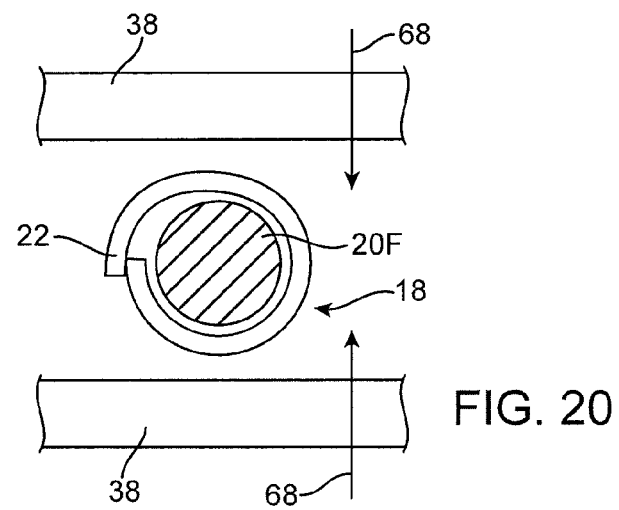
FIGS. 20, 21, and 22 illustrate how a biasing member such as a foam structure may be used to install a zero-force membrane within a portion of an electronic device in accordance with an embodiment of the present invention.
Figure 21:
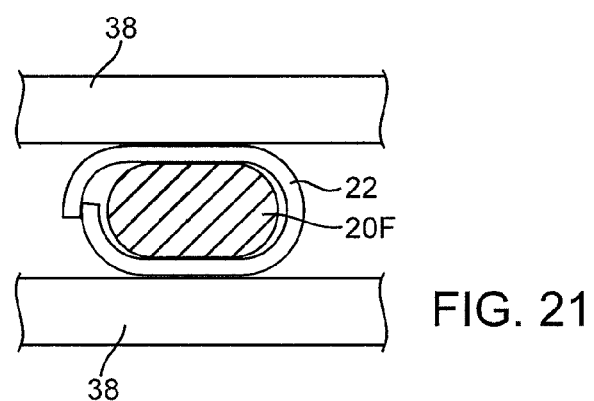
Figure 22:
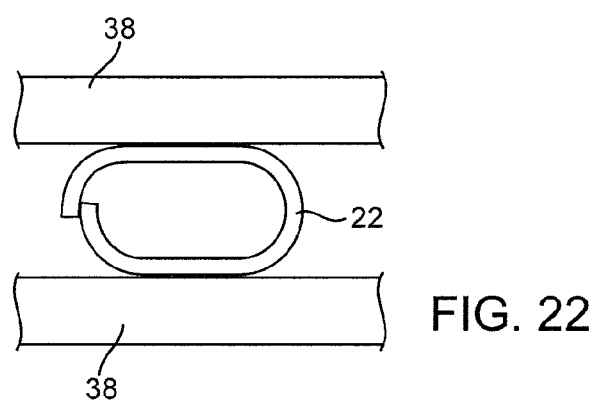

FIGS. 20, 21, and 22 illustrate how a temporary biasing structure may be used to install a zero-force membrane within a portion of an electronic device. As shown in FIG. 10, structure 18 may have an internal biasing structure such as structure 20F. Structure 20F may be, for example, a foam structure. The use of foam for structure 20F is described as an example, but structure 20F may, in general, be any temporary biasing structure.

Membrane layer 22 may include an inner flexible layer covered with an outer layer of adhesive. The inner flexible structure may be formed from a conductive inner flexible structure such as a conductive mesh, sheet of metal foil, or metal-coated polymer or may be formed from a dielectric layer such as a layer of polymer. The outer adhesive layer may be formed from conductive adhesive or non-conducting adhesive and may fully or partly cover layer 22.

Structures 38 may initially be separated, as shown in FIG. 20. When structures 38 are moved in directions 68 to compress foam 20F or when an external tool or other biasing arrangement otherwise causes biasing structure 20F to force membrane 22 against structures 38, the outer (adhesive) surface of layer 22 may be pressed against the exposed surface of structures 38, as shown in FIG. 21 (e.g., foam 20F may be compressed and may bias layer 22 outwards against structures 38).

After the seal between membrane 22 and structures 38 has been formed, foam 20F or other temporary biasing structure may be removed (e.g., by pulling foam 20F out in the direction out of the page in the example of FIG. 21). After foam 20F has been removed, structures 28 (e.g., membrane 22) may form a zero-force membrane seal between structures 38, as shown in FIG. 22.

If desired, temporary biasing structure 20F may be left in place following use of the temporary biasing structures to bias the membrane against structures 38 (e.g., biasing structure 20F may be left in place as shown in the configuration shown in FIG. 21), provided that the temporary biasing structure has been deactivated following use. Deactivating the temporary biasing structure to permanently reduce or eliminate the amount of biasing force that biasing structure 20F produces may be accomplished by altering the temporary biasing structure using an external tool or using other suitable biasing deactivation techniques.

As an example, in a configuration in which temporary biasing structure 20F has been implemented using foam, the temporary biasing structure may be deactivated after use by applying heat or other stimulus. This may collapse the foam, so that the foam no longer generates significant biasing force on membrane 22. If, as another example, temporary biasing structure 20F has been implemented using a spring (e.g., a spring with an oblique or acute L-shaped cross-sectional shape), temporary biasing structure 20F may be deactivating by over-traveling the spring to remove its biasing efficacy, by applying heat, by moving part of the spring structure relative to other parts of the spring structure, or by applying other bias removal stimulus to the spring. Elastomeric materials or materials such as plastic or wax that are used as temporary biasing structure 20F may be deactivated by heat (e.g., to cause the material of structure 20F to soften or otherwise yield and thereby produce less biasing force) or other stimulus.

Membrane installation schemes in which some of temporary biasing structure 20F is removed following membrane installation while some of temporary biasing structure 20F remains in place following membrane installation may also be used, if desired. For example, temporary biasing structure 20F may be formed from a structure with multiple materials. One of the materials (e.g., a foam material) may remain in place after use. The other of the materials may be removed after use (e.g., by evaporating the material by application of heat).

Figure 23:
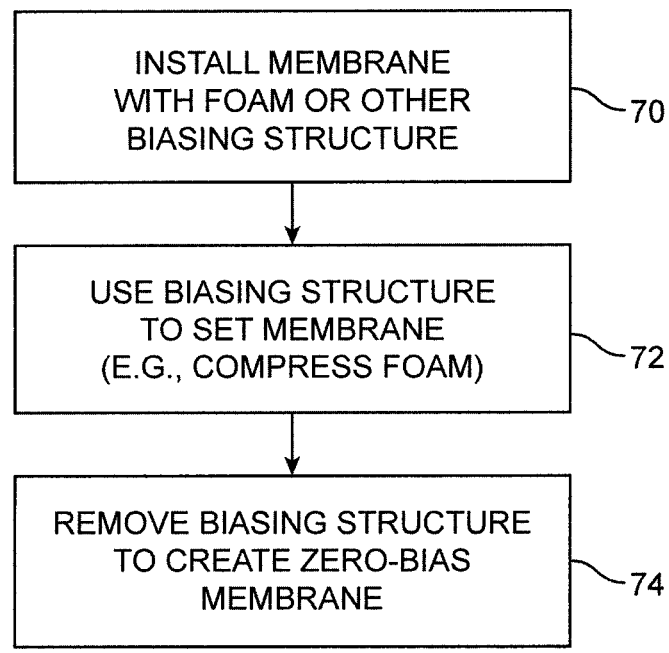
FIG. 23 is a flow chart of illustrative steps involved in incorporating a zero-force membrane into assembled device structures using a removable biasing member such as a foam structure in accordance with an embodiment of the present invention.

FIG. 23 is a flow chart of illustrative steps involved in incorporating a zero-force membrane of the type shown in FIG. 22 into assembled device structures using a temporary biasing member such as structure 20F (FIGS. 20 and 21) in accordance with an embodiment of the present invention.

At step 70, structures 18 may be mounted in device 10, as shown in FIG. 20. Biasing structures such as temporary biasing structure 20F is preferably capable of at least temporarily generating a biasing force to attach membrane 22 of structures 18 in device 10 and may be included in structures 18 during installation of structures 18 in the position shown in FIG. 20. Biasing structure 20F may be fully or partly removable or may be a temporary biasing structure that is not to be removed following use.

At step 72, temporary biasing structures 20F may be used to bias membrane 22 and the adhesive on membrane 22 against the surfaces of structures 38. The adhesive on membrane 22 attaches membrane 22 to structures 38, thereby forming a seal and/or an electrical connection between structures 38.

Once the membrane 22 has been installed, temporary biasing structures 20F may be removed and/or deactivated (step 74). In particular, biasing structures 20F may be deactivated so that the biasing force that is generated by biasing structures 20F are permanently eliminated or at least reduced (e.g., by application of heat or other suitable stimulus). In configurations in which temporary biasing structures 20F are removable temporary biasing structures, biasing structures 20F may be removed from device 10 to remove the biasing forces produced by biasing structures 20F and thereby ensure that membrane 22 serves as a zero-force membrane and does not generate undesired residual biasing forces on structures 38.

The foregoing is merely illustrative of the principles of this invention and various modifications can be made by those skilled in the art without departing from the scope and spirit of the invention.

What is claimed is:

1. An electronic device comprising: structures that are separated by a gap; and an inflatable structure that bridges the gap and that is attached to the structures with adhesive, wherein the adhesive comprises conductive adhesive.

2. The electronic device defined in claim 1 wherein the inflatable structure comprises an elastomeric balloon.

3. The electronic device defined in claim 2 wherein the inflatable structure comprises a sheet of material that is wrapped at least partly around the elastomeric balloon.

4. The electronic device defined in claim 3 wherein the sheet of material includes a layer of material that is at least partly coated with the conductive adhesive.

5. The electronic device defined in claim 4 wherein the layer of material comprises a sheet of metal.

6. The electronic device defined in claim 4 wherein the layer of material comprises a metallized polymer sheet.

7. The electronic device defined in claim 4 wherein the layer of material comprises a metal mesh.

8. The electronic device defined in claim 2 wherein the conductive adhesive at least partly coats the elastomeric balloon.

9. The electronic device defined in claim 2 wherein the elastomeric balloon comprises a depressurization feature.

10. The electronic device defined in claim 9 wherein the depressurization feature comprises a hole.

11. The electronic device defined in claim 9 wherein the depressurization feature comprises a locally weakened portion of the elastomeric balloon that is configured to locally promote rupture of the elastomeric balloon.

12. The electronic device defined in claim 9 wherein the depressurization feature is configured to receive a fluid passageway structure that is configured to remove pressurized fluid from an interior portion of the elastomeric balloon.

13. An electronic device, comprising: a first conductive structure; a second conductive structure; an inflatable structure that forms an electrical pathway between the first and second conductive structures; and conductive adhesive with which the inflatable structure is attached to the first and second conductive structures.

14. The electronic device defined in claim 13 wherein the inflatable structure comprises an elastomeric balloon.

15. The electronic device defined in claim 14 wherein the inflatable structure includes a reservoir.

16. An electronic device comprising: first and second structures separated by at least one gap; an inflatable structure that bridges the gap; and conductive adhesive that attaches the inflatable structure to each of the first and second structures.

17. The electronic device defined in claim 16 wherein the inflatable structure comprises an elastomeric balloon and wherein the conductive adhesive connects the balloon across the gap to form an environmental seal across the gap.

* * * * *